(12) United States Patent
Mutsuda

(10) Patent No.: US 8,765,047 B2
(45) Date of Patent: *Jul. 1, 2014

(54) THERMOPLASTIC RESIN COMPOSITION AND MOLDED PRODUCT THEREOF

(71) Applicant: Daicel-Evonik Ltd., Tokyo (JP)

(72) Inventor: Mitsuteru Mutsuda, Himeji (JP)

(73) Assignee: Daicel-Evonik Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/019,859

(22) Filed: Sep. 6, 2013

(65) Prior Publication Data

US 2014/0008843 A1    Jan. 9, 2014

Related U.S. Application Data

(62) Division of application No. 13/380,650, filed as application No. PCT/JP2010/061697 on Jul. 9, 2010, now Pat. No. 8,663,542.

(30) Foreign Application Priority Data

Jul. 9, 2009  (JP) .................................. 2009-162660

(51) Int. Cl.
   *H05B 6/00*     (2006.01)
   *C08L 61/16*    (2006.01)
   *C08L 71/00*    (2006.01)

(52) U.S. Cl.
   CPC ................. *C08L 61/16* (2013.01); *C08L 71/00* (2013.01); *C08G 2650/40* (2013.01)
   USPC ....................................................... 264/478

(58) Field of Classification Search
   None
   See application file for complete search history.

(56) References Cited

U.S. PATENT DOCUMENTS

| 4,609,714 | A | 9/1986 | Harris et al. |
| 5,342,664 | A | 8/1994 | Drotloff et al. |
| 8,663,542 | B2 * | 3/2014 | Mutsuda ....................... 264/478 |
| 2011/0178237 | A1 | 7/2011 | Ono et al. |

FOREIGN PATENT DOCUMENTS

| JP | 61-500021 A | 1/1986 |
| JP | 4-41557 A | 2/1992 |
| JP | 5-140442 A | 6/1993 |
| JP | 6-503104 A | 4/1994 |
| JP | 7-331055 A | 12/1995 |
| JP | 2006-241201 A | 9/2006 |
| JP | 2007-506833 A | 3/2007 |
| JP | 2008-528768 A | 7/2008 |
| WO | WO 85/01510 A1 | 4/1985 |
| WO | WO 2005/030836 A1 | 4/2005 |
| WO | WO 2006/101611 A2 | 9/2006 |
| WO | WO 2007/101857 A2 | 9/2007 |
| WO | WO 2009/057255 A1 | 5/2009 |

OTHER PUBLICATIONS

English translation of International Preliminary Report on Patentability and Written Opinion dated Feb. 23, 2012, issued in PCT International Application No. PCT/JP2010/061697.

International Search Report, dated Nov. 20, 2010, issued in PCT/JP2010/061697.

Kawano et al., "Crystal, Liquid-Like Amorphous, and Rigid Amourphous for Poly (Ether Ether Ketone)", Polymer Preprints, Tokyo Institute of Technology, vol. 48, No. 14, 1999.

* cited by examiner

*Primary Examiner* — Sheeba Ahmed
(74) *Attorney, Agent, or Firm* — Birch, Stewart, Kolasch & Birch, LLP

(57) ABSTRACT

Thermoplastic resin composition providing improved molding efficiency due to high flowability and a high crystallization temperature, while ensuring desired physical properties (e.g., strength) in a molded product. Also, molded product of the composition. The thermoplastic resin composition comprises a plurality of thermoplastic resins having a melt viscosity different from each other and containing a unit which comprises an arylene group and an ether group and/or a carbonyl group. The thermoplastic resin composition may comprise a first thermoplastic resin having a melt viscosity of 150 to 1500 Pa·s at a temperature of 400° C. and a shear rate of 1216 $s^{-1}$ and a second thermoplastic resin, wherein the melt viscosity ratio of the first thermoplastic resin relative to the second thermoplastic resin, at a temperature of 400° C. and a shear rate of 1216 $s^{-1}$, is 1.5:1 to 10:1.

13 Claims, 1 Drawing Sheet

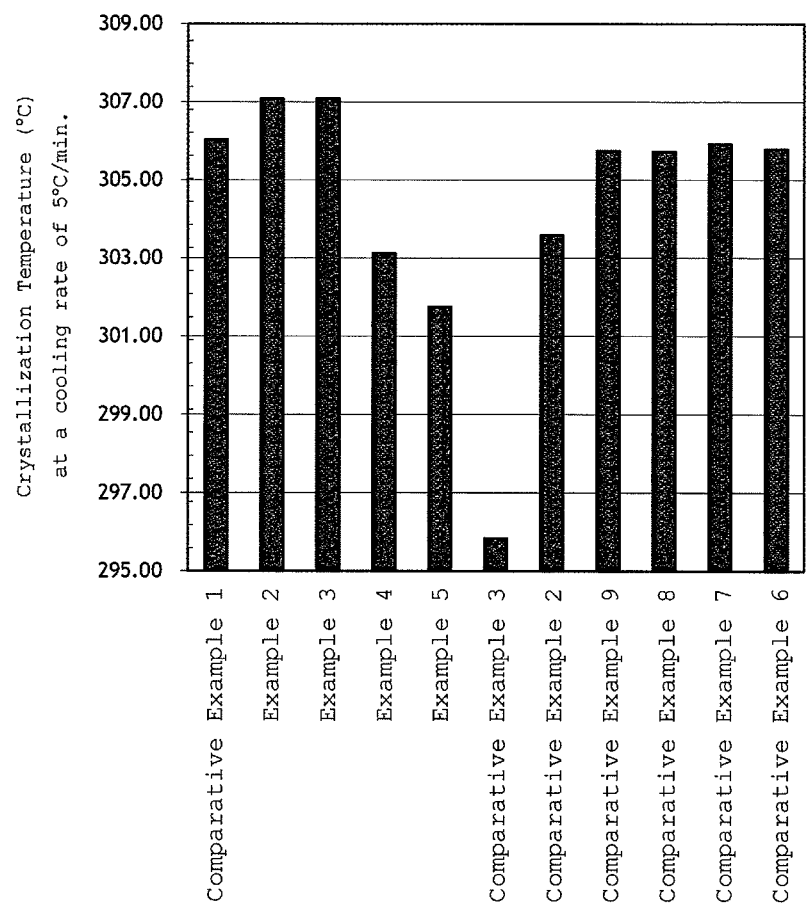

THERMOPLASTIC RESIN COMPOSITION AND MOLDED PRODUCT THEREOF

CROSS REFERENCE WITH PCT APP

The present application is a 37 C.F.R. §1.53(b) divisional of, and claims priority to, U.S. application Ser. No. 13/380,650, filed Dec. 23, 2011, now U.S. Pat. No. 8,663,542. Application Ser. No. 13/380,650 is the national phase under 35 U.S.C. §371 of International Application No. PCT/JP2010/061697, filed on Jul. 9, 2010. Priority is also claimed to Japanese Application No. 2009-162660 filed on Jul. 9, 2009. The entire contents of each of these applications is hereby incorporated by reference.

TECHNICAL FIELD

The present invention relates to a thermoplastic resin composition (for example, a polyetherketone resin composition) of which the molding efficiency can be improved while ensuring a desired physical properties (e.g., mechanical strength) in a molded product, and a molded product of the resin composition.

BACKGROUND ART

A polyetherketone resin [such as a polyetheretherketone (PEEK) or a polyetherketone (PEK)] is a typical semicrystalline thermoplastic resin having excellent heat resistance, chemical resistance, mechanical strength, and others. The polyetherketone resin was developed by ICI in 1978, since then the resin has been used for various application fields, with which the conventional synthetic resins could not cope.

As one of characteristics of PEEK and PEK, which are different from the conventional thermoplastic resins, a higher-order structure thereof is exemplified. A common semicrystalline thermoplastic resin usually has a crystalline phase and an amorphous phase in a solidified state thereof. On the other hand, a polymer compound having a benzene ring or a naphthalene ring in a main chain thereof (e.g., a PEEK and a PEK) has a low-motile amorphous phase called a rigid amorphous, in addition to the crystalline phase and the amorphous phase, which was, for example, reported by a research team of Tokyo Institute of Technology in Society of Polymer Science, Japan, Annual Meeting, in 1999 [Nonpatent Document 1 (Polymer Preprints, Japan, vol. 48, No. 14, p. 3735, 1999)]. Due to such a complex higher-order structure, the polymer compound usually has a large dependency on the molecular weight and the molecular weight distribution of physical properties (particularly, the melt viscosity or the crystallization rate) compared with the common semicrystalline polymer. Furthermore, such a large dependency has great effects on mechanical properties of the product after molding process, which are influenced by the melt viscosity or the crystallization rate. On the other hand, the polymerization process for the PEEK or the PEK is very complicated compared with the conventional common synthetic resins in the following respects: the particularity of a solvent to be used, the high polymerization temperature or high viscosity derived from a high melting point (Tm) or glass transition temperature (Tg) of a synthesized polymer, the necessity of a step for washing a solvent or a remaining monomer in a final process of polymerization, and others. Thus, for example, it is not necessarily easy to develop various grades of polyetherketone resins with different molecular weights by controlling the polymerization reaction, differently from a polyamide resin or a polyester resin. Further, it is more difficult to control the molecular weight distribution, and a grade having a suitable moldability according to application has not been necessarily provided in the market.

Thus, the higher-order structure (e.g., crystal structure) of the polyetherketone resin is complicated. Compared with a common thermoplastic resin, it is difficult to precisely adjust the higher-order structure of the polyetherketone resin by the polymerization condition, due to a low solubility or a high melt viscosity thereof. Moreover, when the higher-order structure cannot be adjusted precisely, it is difficult to stably obtain a polyetherketone resin having a desired melt viscosity or crystallization temperature, and others. In order to stably obtain a molded product having desired mechanical properties from such a polyetherketone resin, enough consideration is needed for a molding process thereof. In particular, the melt viscosity or the crystallization temperature has effects on not only the strength of the molded product but also the working efficiency in a molding process thereof. Therefore, a large technical problem is how to adjust the melt viscosity or the crystallization temperature.

The method for obtaining a resin composition having desired physical properties includes, for example, a method which comprises adding two or more resins suitably. Japanese Patent Application Laid-Open No. 2006-241201 (Patent Document 1, JP-2006-241201A) discloses a styrene-series resin composition comprising (A) one of more styrene-series resins and (B) a thermoplastic resin other than a styrene-series resin, and having a bi-phase continuous structure having a structural period of 0.001 to 1 μm or a dispersed structure having a intergranular distance of 0.001 to 1 μm, wherein the melt viscosity ratio of these components at 180 to 300° C. and a shear rate of 1000 s$^{-1}$ [the component (A)/the component (B)] is not less than 0.1. However, the styrene-series resin is not a crystalline thermoplastic resin and cannot improve the molding cycle even by mixing two kinds of resins.

Japanese Patent Application Laid-Open No. 2008-528768 (Patent Document 2, JP-2008-528768A) discloses a method of manufacturing an electrically conductive composition comprising forming a reduced viscosity molten masterbatch by mixing a molten masterbatch with a first polymer, wherein the first polymer has a melt viscosity that is lower than the melt viscosity of the molten masterbatch; and mixing the reduced viscosity masterbatch with a second polymer. However, the molten masterbatch is mixed with the first polymer having a different melt viscosity in order to improve the compatibility with the second polymer, and the mixture is mixed with the second polymer. Thus, such a mixing has a small effect on the molding cycle and the mechanical properties of a molded product thereof.

Japanese Patent Application Laid-Open No. 2007-506833 (Patent Document 3, JP-2007-506833A) discloses that a pack comprising a polymeric material having a melt viscosity (MV) in the range 0.05 to 0.12 kNsm$^{-2}$ wherein said polymeric material is of a type which includes: (a) phenyl moieties, (b) carbonyl moieties, and (c) ether moieties. This document also discloses a mixture containing a plurality of low-viscosity polyetheretherketones. However, since the low-viscosity polyetheretherketones are mixed together to obtain a highly packing material, the molding cycle or the mechanical properties of a molded product thereof cannot be improved.

WO2009/057255 publication (Patent Document 4) discloses a polyetheretherketone comprising (A) a polymerization component having a molecular weight of not lower than 5,000 and lower than 2,000,000 and (B) a polymerization component having a molecular weight of not lower than 1,000 and lower than 5,000, wherein the weight ratio of (A):(B) is 60:40 to 97:3. However, since the polyetheretherketone contains the oligomer component (B) in addition to the resin component (A), the mechanical properties are deteriorated while improving the flowability.

RELATED ART DOCUMENTS

Patent Documents

Patent Document 1: JP-2006-241201A (Claims)
Patent Document 2: JP-2008-528768A (Claims)
Patent Document 3: JP-2007-506833A (Claims)
Patent Document 4: WO2009/057255 (Claims)

Nonpatent Documents

Nonpatent Document 1: Polymer Preprints, Japan, vol. 48, No. 14, p. 3735, 1999

SUMMARY OF THE INVENTION

Problems to be Solved by the Invention

It is an object of the present invention to provide a thermoplastic resin composition (e.g., a polyetherketone resin composition) of which the molding efficiency can be improved due to a high flowability thereof while ensuring physical properties (such as a strength) in a molded product, and a molded product of the composition.

Another object of the present invention is to provide a thermoplastic resin composition (e.g., a polyetherketone resin composition) of which the molding cycle can be improved due to an improved crystallization temperature thereof, and a molded product of the composition.

It is still another object of the present invention provide a thermoplastic resin composition (e.g., a polyetherketone resin composition) of which the dimensional stability of the molded product can be improved, and a molded product of the composition.

Means to Solve the Problems

The inventor of the present invention made intensive studies to achieve the above objects and finally found that the resin properties can be significantly improved by mixing a plurality of specific thermoplastic resins having a melt viscosity different from each other without special polymerization conditions or molding conditions, for example, (1) when, to a hardly injection-moldable first thermoplastic resin having a high melt viscosity and a low flowability, a small amount of a second thermoplastic resin having a minimum molecular weight required to secure the properties of a molded product thereof is added, the resulting resin composition has an increased crystallization temperature and an improved molding cycle, and (2) when a small amount of the first thermoplastic resin is added to the second thermoplastic resin, the resulting resin composition has significantly improved physical properties such as mechanical properties. The present invention was accomplished based on the above findings.

That is, the thermoplastic resin composition of the present invention comprises a plurality of thermoplastic resins having a melt viscosity different from each other; the thermoplastic resins each contain a unit which comprises an arylene group and a carbonyl group and/or an ether group. The thermoplastic resin at least comprises a first thermoplastic resin and a second thermoplastic resin, and the first thermoplastic resin has a melt viscosity of about 150 to 1500 Pa·s at a temperature of 400° C. and a shear rate of $1216\ s^{-1}$. The melt viscosity ratio of the first thermoplastic resin relative to the second thermoplastic resin at a temperature of 400° C. and a shear rate of $1216\ s^{-1}$ is about 1.5/1 to 10/1 (for example, about 3/1 to 5/1) as a ratio of the former/the latter.

The thermoplastic resins may comprise a polyetherketone resin (for example, at least one member selected from the group consisting of a polyetheretherketone and a polyetherketone).

The melt viscosity of the second thermoplastic resin at the temperature of 400° C. and the shear rate of $1216\ s^{-1}$ may be about 90 to 150 Pa·s.

The ratio (weight ratio) of the first thermoplastic resin relative to the second thermoplastic resin is not particularly limited to a specific one, and may be selected from the range of about 99/1 to 1/99 as a ratio of the former/the latter. For example, when the ratio of the second thermoplastic resin relative to 100 parts by weight of the first thermoplastic resin is small (about 1 to 50 parts by weight, e.g., about 1 to 45 parts by weight), the crystallization temperature of the resin composition (the first thermoplastic resin) can be significantly improved. On the other hand, when the ratio of the first thermoplastic resin relative to 100 parts by weight of the second thermoplastic resin is small (about 1 to 50 parts by weight, e.g., about 1 to 45 parts by weight), the physical properties (e.g., mechanical properties) of the resin composition (the second thermoplastic resin) can significantly be improved. The crystallization temperature of the thermoplastic resin composition of the present invention may be higher than the weighted average of the crystallization temperatures of the plurality of the thermoplastic resins, and, for example, may be not lower than the crystallization temperature of the second thermoplastic resin.

The thermoplastic resin composition may be obtained by melt-kneading the plurality of thermoplastic resins. Moreover, the thermoplastic resin composition may have one or a plurality of molecular weight peaks in a molecular weight measurement by a gel filtration chromatography. The present invention also includes a method for increasing a crystallization temperature of a thermoplastic resin composition (a first thermoplastic resin), which comprises adding, to a first thermoplastic resin having a melt viscosity of about 150 to 1500 Pa·s at a temperature of 400° C. and a shear rate of $1216\ s^{-1}$, a second thermoplastic resin, wherein the melt viscosity ratio of the first thermoplastic resin relative to the second thermoplastic resin at a temperature of 400° C. and a shear rate of $1216\ s^{-1}$ about 1.5/1 to 10/1 as a ratio of the former/the latter. According to the method, a crystallization temperature of the resin composition can be higher than that of the weighted average of the first thermoplastic resin and the second thermoplastic resin.

Moreover, the present invention includes a molded product formed from the thermoplastic resin composition. The molded product may be formed by injection molding. The molded product of the present invention may be a molded product which has a thin molded portion, for example, a region having a thickness of not more than 2 mm, or a molded product which has a region (e.g., a band-like region) having a thickness of not more than 2 mm and a width of not more than 10 mm.

Effects of the Invention

According to the present invention, since a plurality of specific thermoplastic resins having a melt viscosity different from each other are mixed together without special polymerization conditions or molding conditions, the flowability and the crystallization temperature of the resin composition can be increased and the molding efficiency thereof can be significantly improved while ensuring the mechanical properties of the molded product. In particular, the larger the difference in melt viscosity is, the larger the improvement effect of the molding efficiency is. More specifically, addition, to a hardly injection-moldable first thermoplastic resin having a high melt viscosity and a low flowability, of a small amount of a second thermoplastic resin having a minimum molecular weight required to secure the properties of a molded product thereof can significantly increase the crystallization temperature. On the other hand, addition of a small amount of the first thermoplastic resin to the second thermoplastic resin can significantly improve the mechanical properties of the molded product. The thermoplastic resin composition of the present invention can have a crystallization temperature higher than that expected from the crystallization temperatures of the thermoplastic resins to be mixed (the weighted average crystallization temperature) and can be crystallized in a short time and released from a metal mold. Therefore, the molding cycle can drastically be shortened. Moreover, according to the present invention, due to a high crystallization temperature and a large crystallization rate, the dimensional stability of the molded product can also be improved.

BRIEF DESCRIPTION OF DRAWINGS

FIG. 1 is a graph showing crystallization temperatures of polyetherketone resins or compositions in Examples and Comparative Examples.

DESCRIPTION OF EMBODIMENTS

The thermoplastic resin composition of the present invention contains a plurality of (e.g., about 2 to 4, preferably about 2 to 3) thermoplastic resins (e.g., crystalline thermoplastic resins) having a melt viscosity different from each other. Each one of the thermoplastic resins contains a unit comprising an arylene group and an ether group and/or a carbonyl group, for example, a unit represented by the following formula (1):

[Formula 1]

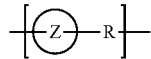

(1)

[wherein, the ring Z represents an arene ring, and R is the same or different from each other in each unit and represents an oxygen atom or a carbonyl group (—C(O)—).] In each unit, the species of the group R and the ring Z may be the same or different from each other. Incidentally, the group R may be a —C(O)O— bond (ester bond) in some units. Usually, the group R is not a —C(O)O— bond.

The arene ring represented by the ring Z may include a $C_{6-10}$arene ring such as benzene or naphthalene, a $C_{6-10}$aryl $C_{6-10}$arene ring such as biphenyl or binaphthyl, and others. Incidentally, the ring Z may have a substituent. The substituent may include a $C_{1-6}$alkyl group such as methyl or ethyl group (preferably a $C_{1-4}$alkyl group), and others.

The thermoplastic resin may for example be a polyphenyleneether-series resin (e.g., a polyphenyleneether and a modified polyphenyleneether), and usually a polyetherketone resin (an aromatic polyetherketone resin). The polyetherketone resin is not particularly limited to a specific one and, usually, the resin suitably contains an arylene group (e.g., phenylene group), a carbonyl group, and an ether group. For example, the polyetherketone resin may include a polyetherketone, a polyetheretherketone, a polyetherketoneketone, a polyetherketoneetherketoneketone, a polyetheretherketoneketone, and a polyether-diphenyl-ether-phenyl-ketone-phenyl.

These thermoplastic resins may be used alone or in combination. Among these thermoplastic resins, a polyetherketone resin is preferred, and a polyetheretherketone or a polyetherketone is particularly preferred.

The combination of the thermoplastic resins in the thermoplastic resin composition is not particularly limited to a specific one. The combination of the polyetherketone resins of the same kind (e.g., a combination of a plurality of polyetheretherketones only, and a combination of a plurality of polyetherketones only) is preferred.

The molecular weight of the thermoplastic resin is not particularly limited to a specific one as far as the thermoplastic resin can be melt-kneaded or molded. For example, the number average molecular weight of the thermoplastic resin may be not less than 5,000 (e.g., about 5,000 to 1,000,000), preferably not less than 8,000 (e.g., about 10,000 to 500,000), more preferably not less than 15,000 (e.g., about 18,000 to 100,000), and particularly not less than 20,000 (e.g., about 20,000 to 50,000) in terms of polystyrene in a gel permeation chromatography (GPC). Moreover, the molecular weight distribution (Mw/Mn) may for example be about 1.5 to 5, preferably about 1.8 to 4, and more preferably about 2 to 3.5. Incidentally, for the thermoplastic resin, as the molecular weight is higher, usually the mechanical properties of the resin are improved and the flowability decreases. However, the polyetherketone resin shows a specific behavior due to a small entanglement molecular weight. That is, only slight increase of the molecular weight significantly changes (e.g., lowers) the flowability. Moreover, when the molecular weight is increased, the entangling of the molecules is increased and the crystallization rate is lowered. Therefore, the physical properties (e.g., mechanical properties) complicatedly vary depending on the molecular weight.

The melt viscosity of the thermoplastic resin is not particularly limited to a specific one. For example, the melt viscosity of the thermoplastic resin at a temperature of 400° C. and a shear rate of 1216 $s^{-1}$ may be selected from the range of about 90 to 1500 Pa·s, and may be about 90 to 800 Pa·s, preferably about 95 to 700 Pa·s, and more preferably about 100 to 600 Pa·s (e.g., about 100 to 500 Pa·s). Incidentally, a resin having a melt viscosity of lower than 90 Pa·s has a molecular weight in an oligomer region. Even when such a resin is mixed with a high-viscosity thermoplastic resin, the resulting mixture sometimes fails to improve the mechanical strength of the molded product thereof.

The crystallization temperature of the thermoplastic resin is not particularly limited to a specific one as far as the thermoplastic resin can be melt-kneaded or molded. For example, the crystallization temperature of the thermoplastic resin at a cooling rate of 5° C./minute may be about 290 to 310° C., preferably about 291 to 309° C., and more preferably about 292 to 308° C.

These thermoplastic resins to be used may be products on the market or may be produced by a known method. For example, a representative production process of the polyetherketone resin may include a process which comprises polycondensing an aromatic diol component and an aromatic dihalide component (provided that any one of these components contains a component having at least a carbonyl group), or aromatic monohalide monool components (provided that any one of the components contains an aromatic monohalide monool component having at least a carbonyl group) at a temperature range of 150° C. to 400° C. in the presence of an alkali metal salt and a solvent.

Examples of the aromatic diol component may include hydroquinone, examples of the aromatic dihalide component may include 4,4'-difluorobenzophenone, and examples of the aromatic monohalide monool component may include 4-fluorophenol and 4-fluoro-4'-hydroxybenzophenone.

The alkali metal salt may include, for example, anhydrous potassium carbonate. Examples of the solvent may include diphenylsulfone.

After the polycondensation reaction is completed, the resulting resin may be pulverized, washed with acetone, methanol, ethanol, water, or the like, and dried. Incidentally, the crystallization temperature of the polyetherketone resin may suitably be adjusted by modifying a terminal group thereof (usually, a halogen atom) with an alkaline sulfonic acid group (e.g., sodium sulfonate group, potassium sulfonate group, and lithium sulfonate group). It is preferable that the resin be used without modifying a terminal group thereof.

The thermoplastic resin composition at least comprises a first thermoplastic resin (e.g., a higher-viscosity thermoplastic resin) and a second thermoplastic resin (e.g., a lower-viscosity thermoplastic resin) having a melt viscosity different from each other. The chemical structure of the first thermoplastic resin and that of the second thermoplastic resin may be the same or different from each other. Even when these resins have the same chemical structure, the resin properties can significantly be improved.

Among the plurality of thermoplastic resins contained in the thermoplastic resin composition, the melt viscosity of the first thermoplastic resin (e.g., a thermoplastic resin having the highest melt viscosity) at a temperature of 400° C. and a shear rate of 1216 $s^{-1}$ may for example be selected from the range of not less than 150 Pa·s (e.g., about 150 to 1500 Pa·s) and may for example be not less than 160 Pa·s (e.g., about 170 to 800 Pa·s), preferably not less than 200 Pa·s (e.g., about 250 to 700 Pa·s), more preferably not less than 300 Pa·s (e.g., about 350 to 600 Pa·s), and particularly not less than 400 Pa·s (e.g., about 400 to 500 Pa·s). Moreover, the melt viscosity of the second thermoplastic resin (e.g., a thermoplastic resin having the lowest melt viscosity) at a temperature of 400° C. and a shear rate of 1216 s may for example be not more than 170 Pa·s (e.g., about 90 to 160 Pa·s), preferably not more than 150 Pa·s (e.g., about 95 to 140 Pa·s), more preferably not more than 130 Pa·s (e.g., about 100 to 120 Pa·s), and particularly not more than 110 Pa·s (e.g., about 100 to 110 Pa·s). When the melt viscosity of the second thermoplastic resin is higher than 170 Pa·s, it is sometimes difficult to obtain a desired flowability.

In view of a significant improvement of resin properties, at a temperature of 400° C. and a shear rate of 1216 $s^{-1}$, the melt viscosity ratio of the first thermoplastic resin relative to the second thermoplastic resin [the former/the latter] may be about 1.5/1 to 10/1, preferably about 2/1 to 8/1 (e.g., about 2.5/1 to 6/1), and more preferably about 3/1 to 5/1. When the melt viscosity of the first thermoplastic resin is lower than 1.5 times of that of the second thermoplastic resin, there is a tendency that properties of resins contained in the composition are too similar. Therefore, it is sometimes difficult to obtain a desired crystallinity, mechanical strength, and others.

According to the present invention, only addition of a small amount of one of the first thermoplastic resin and the second thermoplastic resin to the other thermoplastic resin allows the characteristics (e.g., crystallization temperature, and mechanical properties such as impact resistance) of the composition to be improved significantly. Thus, the weight ratio of the first thermoplastic resin relative to the second thermoplastic resin is not particularly limited to a specific one, and may suitably be selected from the range of about 99/1 to 1/99 as a ratio of the former/the latter. For example, when the strength of the molded product to be obtained is regarded as important, the first thermoplastic resin/the second thermoplastic resin (weight ratio) may be about 95/5 to 50/50, preferably about 90/10 to 60/40 (e.g., about 85/15 to 65/35), and more preferably about 80/20 to 70/30. When the moldability is regarded as important, the first thermoplastic resin/the second thermoplastic resin (weight ratio) may be about 50/50 to 1/99 (e.g., about 45/55 to 5/95), preferably about 40/60 to 10/90 (e.g., about 35/65 to 10/90), and more preferably about 30/70 to 10/90.

In particular, when the second thermoplastic resin relative to 100 parts by weight of the first thermoplastic resin is about 1 to 50 parts by weight (e.g., about 1 to 45 parts by weight, preferably about 10 to 40 parts by weight, and preferably about 20 to 35 parts by weight), the resulting resin composition can improve the crystallization temperature and drastically shorten the molding cycle. On the other hand, when the first thermoplastic resin relative to 100 parts by weight of the second thermoplastic resin is about 1 to 50 parts by weight (e.g., about 1 to 45 parts by weight, preferably about 10 to 40 parts by weight, and preferably about 20 to 35 parts by weight), the resulting resin composition can significantly improve the physical properties (such as mechanical properties).

The proportion of the total of the first thermoplastic resin and the second thermoplastic resin in the whole thermoplastic resin composition may for example be not less than 50% by weight, preferably not less than 70% by weight, more preferably not less than 80% by weight (e.g., about 90 to 100% by weight).

The melt viscosity of the thermoplastic resin composition at a temperature of 400° C. and a shear rate of 1216 $s^{-1}$ is about 100 to 800 Pa·s (e.g., about 100 to 700 Pa·s), preferably about 100 to 600 Pa·s, and more preferably about 110 to 500 Pa·s (e.g., about 120 to 450 Pa·s and preferably about 130 to 400 Pa·s). When the melt viscosity is lower than 100 Pa·s, there is sometimes a problem on the strength of the obtained molded product. When the melt viscosity is higher than 800 Pa·s, there is sometimes a problem on the moldability.

The thermoplastic resin composition of the present invention has a high crystallization temperature. The crystallization temperature is an indicator which reflects a crystallization rate affecting a time cycle of a molding step. That is, the crystallization rate can be evaluated by a crystallization temperature on cooling a molten substance at a constant cooling rate, for example, in a differential scanning calorimetry. The higher the crystallization temperature is, the larger the crystallization rate is, and the molding cycle can be shortened. The crystallization temperature of the thermoplastic resin composition may for example be not lower than 300° C., preferably not lower than 303° C., and more preferably not lower than 306° C. (e.g., about 306 to 308° C.). When the crystallization temperature is lower than 300° C., it takes a time to release the composition from a metal mold after molding step, which has sometimes an adverse effect on the molding cycle.

The crystallization temperature of the thermoplastic resin composition may for example be not lower than the crystallization temperature of the first thermoplastic resin (for example, not lower than the lowest crystallization temperature among the crystallization temperatures of the resins constituting the composition), preferably higher than the weighted average of the crystallization temperatures of the constituent resins, more preferably not lower than the crystallization temperature of the second thermoplastic resin (for example, not lower than the highest crystallization temperature among the crystallization temperatures of the constituent resins), and not higher than the weighted average crystallization temperature plus 1 to 10° C. (e.g., 1 to 5° C.). Since such a thermoplastic resin composition is crystallized at a higher temperature compared with the case where any one, some, or all of resins constituting the composition are used independently (or separately), the composition can achieve an improvement in the shortening of the molding cycle, such as rapid release from a metal mold due to a faster crystallization, for example, after from a melt-kneading step through a molding step (such as extrusion or injection). Incidentally, the crystallization temperatures of each thermoplastic resin and resin composition mean a crystallization temperature in a process composed of heating from −10° C. to 410° C. at a rate of 20° C./minute, maintaining at 410° C. for one minute, cooling at a cooling rate of 5° C./minute. The crystallization temperatures can be measured by a differential scanning calorimeter.

The thermoplastic resin composition also has well-balanced flowability and mechanical properties. For example, the flow length (spiral flow) under the conditions of a width of 6 mm, a thickness of 2 mm, a cylinder temperature of 380° C., a metal mold temperature of 180° C., and a pressure of 1000 bar may be about 30 to 70 cm, preferably about 35 to 65 cm, and more preferably about 40 to 60 cm (e.g., about 45 to 55 cm). Moreover, the tensile strength at break is about 95 to 120 MPa and preferably about 100 to 110 MPa in accordance with ISO527. Moreover, the Charpy impact strength may be about 8 to 20 KJ/m$^2$, preferably about 9 to 18 KJ/m$^2$, and more preferably about 10 to 15 KJ/m$^2$ in accordance with ISO179/1eA. Incidentally, when there is a large difference between the thermoplastic resins to be mixed in melt viscosity, the impact strength of the resin composition can be further improved. For example, the impact strength of the resin composition can be larger than the impact strength (that) of the thermoplastic resin alone.

The thermoplastic resin composition may have a single peak or may have two or more molecular weight peaks in a molecular weight by a gel filtration chromatography. Moreover, the molecular weight peaks may correspond to each thermoplastic resin. The presence of the different molecular weight peaks improves the crystal structure or the packing structure in a molecule level thereof after melt-kneading, and then significantly improves the strength of the resin composition. Specifically, it is presumed that a resin having a low molecular weight functions as a kind of nucleation agent. In particular, when the physical properties (e.g., melt viscosity, crystallization temperature, and crystallization rate) of a resin having low molecular weight are greatly different from those of a resin having a high molecular weight, these physical properties of the obtained resin composition can be improved markedly. The composition may be obtained by mixing two or more resins with different molecular weights or obtained under such a production process conditions as a polymerization process conditions to obtain one or more molecular weight peaks. Thus, the thermoplastic resin composition of the present invention can greatly improve the crystallization temperature without containing a nucleation agent substantially.

Incidentally, although the number of molecular weight peaks usually depends on the number of resins constituting the composition, is not limited to the number of the resins (the dependence is not exclusive). One of resins constituting the composition may have two or more molecular weight peaks, or the composition may comprise two or more resins each having a molecular weight peak at (in) the same molecular weight value. In order to easily adjust a desired crystallinity or mechanical strength, and others, it is preferable that the resins contained in the composition have different molecular weights from each other. The measurement method of a molecular weight in a gel filtration chromatography is not particularly limited to a specific one, and may include, for example, a method described in Japanese Patent Application Laid-Open No. 2004-45166.

The thermoplastic resin composition may be a mixture of thermoplastic resins constituting the resin composition [or a simple mixture (e.g., a dry blend product and a pre-mixture), for example, a pellet mixture, a particulate (or powder) mixture, or (and) a mixture of pellet and particulate (or powder)] or may be obtained by melt-kneading a plurality of thermoplastic resins (or the mixture) constituting the resin composition. The melt-kneading allows the crystal structure or packing structure of the resin composition to be improved in a molecule level, which significantly improves the physical properties of the resin composition and can provide the resin composition having a uniform and stable quality.

The resins constituting the thermoplastic resin composition or the composition may contain an additive. The additive may include a reinforcer [for example, a particulate reinforcer such as a mineral particle (e.g., a talc, a silica, and a kaolin), a metal oxide (e.g., magnesium oxide, aluminum oxide, and zinc oxide), or a metal sulfate (e.g., calcium sulfate and barium sulfate); and a fibrous reinforcer such as a carbon fiber, a glass fiber, a stainless-steel fiber, or an aramid fiber], a thermal-conductivity improver (e.g., alumina), a color material or a coloring agent (e.g., a carbon black), a stabilizer, a plasticizer, a lubricant, and others. These additives may be used alone or in combination.

The thermoplastic resin composition can be prepared by a conventional manner, for example, by mixing each component. The thermoplastic resin composition may be prepared, for example, by a dry blend which comprises simply mixing each component in a particulate or pellet form without melt-kneading [usually, a dry blend which comprises mixing each component at a room temperature with a mixer (such as a tumbler or a V-shaped blender)] or by melt-kneading each component. More specifically, the thermoplastic resin composition is often prepared by pre-mixing each component with a mixer (e.g., a tumbler, a V-shaped blender, a Henschel mixer, a nauta mixer, a ribbon mixer, a mechanochemical apparatus, and an extrusion blender) if necessary, and then melt-kneading each component (or the pre-mixture) at a temperature of about 300 to 450° C. (preferably about 350 to 400° C.) with a variety of melt-kneaders (e.g., a kneader, and a monoaxial or biaxial screw extruder). The melt-kneaded product may be pelletized with the use of a conventional pelletizing means (e.g., a pelletizing machine).

The thermoplastic resin composition of the present invention can be molded (or formed) into a desired shape. The molding method is not particularly limited to a specific one. The thermoplastic resin composition can be molded by a known method such as an extrusion molding or an injection molding. Among these molding methods, an injection molding is preferred.

Since the thermoplastic resin composition of the present invention can improve the crystallization rate due to the improvement of the crystallization temperature, for example, the difference between the vicinity of the external surface of the molded product and the inside of the molded product in crystallinity which usually occurs in a cooling process after molding such as an extrusion molding or an injection molding can be reduced. As a result, the accuracy of dimension of the molded product can be increased.

The molded product of the present invention is not particularly limited to a specific one as far as the molded product is formed from the thermoplastic resin composition. The molded product may have a variety of forms (for example, a two-dimensional form such as a film-like form, a sheet-like form, or a band-like form; and a three-dimensional form such as a rod-like form, a pipe-like form, or a solid form). The molded product may be a thin molded product or a molded product having a thin molded portion, for example, may be a molded product which has a region (a thin region) having a thickness of not more than 2 mm (e.g., about 0.01 to 2 mm and preferably about 0.1 to 1.5 mm) or a molded product which has a region having a thickness of not more than 2 mm and a width of not more than 10 mm (e.g., a band-like region or a band-like thin molded portion). That is, the thermoplastic resin composition of the present invention has a high toughness even when subjected to thin-molding. Thus, when the resin composition is molded into a thin film-like or sheet-like form or into a thin and narrow band-like form, the resulting molded product has an excellent toughness compared with individual molded products of the resins constituting the composition. The film-like or sheet-like molded product preferably has a thickness of not more than 2 mm (e.g., about 0.01 to 2 mm and preferably about 0.1 to 1.5 mm). The band-like molded product preferably has a thickness of not more than 2 mm (e.g., about 0.01 to 2 mm and preferably about 0.1 to 1.5 mm) and a width of 10 mm (e.g., about 1 to 10 mm and preferably about 2 to 8 mm).

EXAMPLES

Hereinafter, the following examples are intended to describe this invention in further detail and should by no means be interpreted as defining the scope of the invention.
[Polyetherketone Resin]
The following polyetherketone resins were used.
1000G: Polyetheretherketone VESTAKEEP 1000G (manufactured by Daicel-Evonik Ltd.)
2000G: Polyetheretherketone VESTAKEEP 2000G (manufactured by Daicel-Evonik Ltd.)
4000G: Polyetheretherketone VESTAKEEP 4000G (manufactured by Daicel-Evonik Ltd.)
[Measuring Method of Melt Viscosity]
For each polyetherketone resin or each resin composition, the melt viscosity was measured at 400° C. and a shear rate of 1216 s$^{-1}$ under a weighting of 0.1 kN on pre-heating using a capillary rheometer (manufactured by Shimadzu Corporation, RHEOLOSTER ACER-01, capillary length: 10 mm, capillary diameter: 1 mm, and barrel diameter: 9.55 mm).
[Measuring Method of Crystallization Temperature]
Each polyetherketone resin or each resin composition (4.5 to 10.0 mg) was cooled to −10° C. and maintained for one minute, then heated at a heating rate of 20° C./minute and maintained at 410° C. for one minute, and then cooled at a cooling rate of 5° C./minute using a differential scanning calorimeter (manufactured by Seiko Instruments & Electronics Ltd., SSC5200). The initially obtained peak position in the cooling process was regarded as a crystallization temperature.
[Evaluation of Flowability]
For each polyetherketone resin or each resin composition, the flow length was measured at a metal mold temperature of 180° C., a cylinder temperature of 380° C., and a pressure of 1000 bar using a metal mold for spiral flow measurement (width: 6 mm, and thickness: 2 mm).
[Evaluation of Strength at Break]
The strength at break was measured in accordance with ISO527.
[Evaluation of Impact Strength]
The Charpy impact strength was measured in accordance with ISO179/1eA.
[Evaluation of Toughness]
Each polyetherketone resin or each resin composition was formed into a band-like molded product (5 mm in width, 1 mm in thickness, and 500 mm in length). The molded product was bent to form a single loop with a diameter of not less than 20 mm, and both ends of the band were pulled to gradually reduce the diameter of the loop portion. At the time when the diameter of the loop was 5 mm, the break status of the loop portion was observed. Five (5) samples per polyetherketone resin or resin composition were used to evaluate the toughness. The results were evaluated based on the following criteria.
A: Not broken (All samples were not broken)
B: Hardly broken (One or two samples were broken)
C: Broken (Three or more samples were broken)

Examples and Comparative Examples

The above-mentioned polyetherketone resins were used alone or mixed in a proportion shown in Table 1. For the resins and the resulting polyetherketone resin compositions, the melt viscosity, the crystallization temperature, the flowability, the strength at break, the impact strength, and the toughness were measured or evaluated. The results are shown in Table 1.

TABLE 1

|  | Comparative Examples | | | Examples | | | | | | | | |
| --- | --- | --- | --- | --- | --- | --- | --- | --- | --- | --- | --- | --- |
|  | 1 | 2 | 3 | 1 | 2 | 3 | 4 | 5 | 6 | 7 | 8 | 9 |
| 1000 G (% by weight) | 100 |  |  | 90 | 80 | 60 | 40 | 20 | 80 | 60 | 40 | 20 |
| 2000 G (% by weight) |  | 100 |  |  |  |  |  |  | 20 | 40 | 60 | 80 |
| 4000 G (% by weight) |  |  | 100 | 10 | 20 | 40 | 60 | 80 |  |  |  |  |
| Melt viscosity (Pa · s) | 104.8 | 164.3 | 432.0 | 122.0 | 144.9 | 177.2 | 287.0 | 343.0 | 114.8 | 122.0 | 134.9 | 151.4 |
| Crystallization temperature (° C.) | 306.0 | 303.6 | 295.8 | 307.1 | 307.1 | 307.1 | 303.1 | 301.7 | 305.8 | 305.9 | 305.7 | 305.7 |

TABLE 1-continued

|  | Comparative Examples | | | Examples | | | | | | | | |
| --- | --- | --- | --- | --- | --- | --- | --- | --- | --- | --- | --- | --- |
|  | 1 | 2 | 3 | 1 | 2 | 3 | 4 | 5 | 6 | 7 | 8 | 9 |
| Flow length (cm) | 60 | 35 | 27 | 55 | 50 | 45 | 40 | 35 | 50 | 45 | 35 | 35 |
| Tensile strength at break (MPa) | 103 | — | 96 | 103 | 102 | 101 | 99 | 97 | — | — | — | — |
| Charpy impact strength (KJ/m$^2$) | 6 | 7 | 8 | 9 | 12 | 9 | 9 | 10 | 8 | 8 | 8 | 8 |
| Toughness | C | B | A | B | A | A | A | A | B | B | A | A |

In all of Examples 2 to 5, it is observed that the resin composition has an excellent flowability and a high crystallization temperature while sufficiently maintaining the toughness of resins constituting the composition. Among Examples, each of Examples 1 and 2 has notable characteristics in the respect that the resin composition has a crystallization temperature higher than the crystallization temperature of each resin (1000G and 4000G) constituting the composition. In particular, Examples 1 and 2, in which a small amount of 4000G was added to 1000G, have significantly improved mechanical properties (such as toughness and impact strength) compared with the values expected from the mixing ratio of 1000G and 4000G. Moreover, Examples 5, in which a small amount of 1000G was added to 4000G, has a significantly improved crystallization temperature compared with the value expected from the mixing ratio of 1000G and 4000G [for example, the weighted average crystallization temperature (298° C.)].

In all of Examples 6 to 9, it is observed that the resin composition has a high crystallization temperature while showing a toughness or flowability higher than those of the resins constituting the composition. In particular, each of Examples 8 and 9 has notable characteristics in the respect that the resin composition has a toughness higher than the toughness of each resin (1000G and 2000G) constituting the composition.

INDUSTRIAL APPLICABILITY

The thermoplastic resin composition of the present invention and the molded product thereof can be used in various forms (such as a film-like form, a band-like form, a rod-like form, or pipe-like form) as a member for a product which needs a heat resistance, a chemical resistance, and toughness (e.g., a semiconductor, an electronic machine, an automobile, and a flying machine).

The invention claimed is:

1. A method for improving moldability of a thermoplastic resin composition, said composition comprising a combination of a first polyetheretherketone and a second polyetheretherketone which have a melt viscosity different from each other,
which comprises adding or mixing the first polyetheretherketone relative to or with the second polyetheretherketone in a weight ratio of about 50/50 to 1/99 as a ratio of the former/the later, and melt-kneading the resultant mixture,
wherein the first polyetheretherketone has a melt viscosity of 150 to 1500 Pa·s at a temperature of 400° C. and a shear rate of 1216 s$^{-1}$, and
the melt viscosity ratio of the first polyetheretherketone relative to the second polyetheretherketone at a temperature of 400° C. and a shear rate of 1216 s$^{-1}$ is 1.5/1 to 10/1 as a ratio of the former/the latter.

2. A method according to claim 1, wherein the melt viscosity ratio of the first polyetheretherketone relative to the second polyetheretherketone at the temperature of 400° C. and the shear rate of 1216 s$^{-1}$ is 3/1 to 5/1 as a ratio of the former/the latter.

3. A method according to claim 1, wherein the melt viscosity of the second polyetheretherketone at the temperature of 400° C. and the shear rate of 1216 s$^{-1}$ is 90 to 150 Pa·s.

4. A method according to claim 1, wherein the weight ratio of the first polyetheretherketone relative to the second polyetheretherketone is about 45/55 to 5/95 as a ratio of the former/the later.

5. A method according to claim 1, wherein the weight ratio of the first polyetheretherketone relative to the second polyetheretherketone is about 40/60 to 10/90 as a ratio of the former/the later.

6. A method according to claim 1, which increases a crystallization temperature of the thermoplastic resin composition.

7. A method according to claim 1, which increases a crystallization temperature of the thermoplastic resin composition to a crystallization temperature higher than the weighted average of the crystallization temperatures of the first and second polyetheretherketones.

8. A method according to claim 1, which increases a crystallization temperature of the thermoplastic resin composition to a crystallization temperature of not lower than the crystallization temperature of the second polyetheretherketone.

9. A method according to claim 1, which increases a crystallization temperature of the thermoplastic resin composition to a crystallization temperature of not lower than the highest crystallization temperature among the first and second polyetheretherketones.

10. A method according to claim 1, which shortens a molding cycle for improving the moldabiity of the thermoplastic resin composition.

11. A method for increasing a crystallization temperature of a thermoplastic resin composition or shortening a molding cycle of the thermoplastic resin composition, said composition comprising a combination of a first polyetheretherketone and a second polyetheretherketone which have a melt viscosity different from each other,
which comprises adding or mixing the first polyetheretherketone relative to or with the second polyetheretherketone in a weight ratio of about 50/50 to 1/99 as a ratio of the former/the later,
melt-kneading the resultant mixture, and
injecting the molten mixture into a metal mold,
wherein the first polyetheretherketone has a melt viscosity of 150 to 1500 Pa·s at a temperature of 400° C. and a shear rate of 1216 s$^{-1}$, and
the melt viscosity ratio of the first polyetheretherketone relative to the second polyetheretherketone at a temperature of 400° C. and a shear rate of 1216 s$^{-1}$ is 1.5/1 to 10/1 as a ratio of the former/the latter.

12. A method according to claim 11, wherein a molded product having a region having a thickness of not more than 2 millimeters is obtained.

13. A method according to claim 11, wherein a molded product having a region of a thickness of not more than 2 millimeters and a width of not more than 10 millimeters is obtained.

* * * * *